Dec. 8, 1931.  P. G. KRIPPNER  1,835,882
ELECTRICAL TESTING DEVICE
Filed April 21, 1931
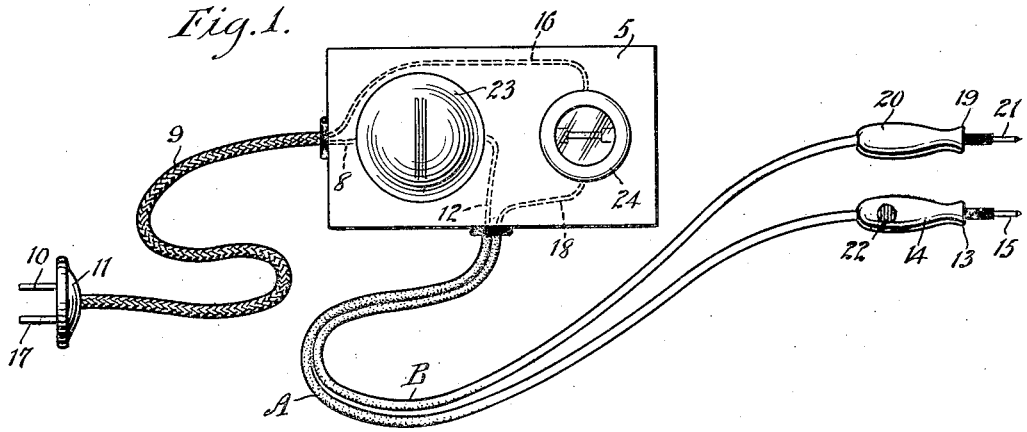
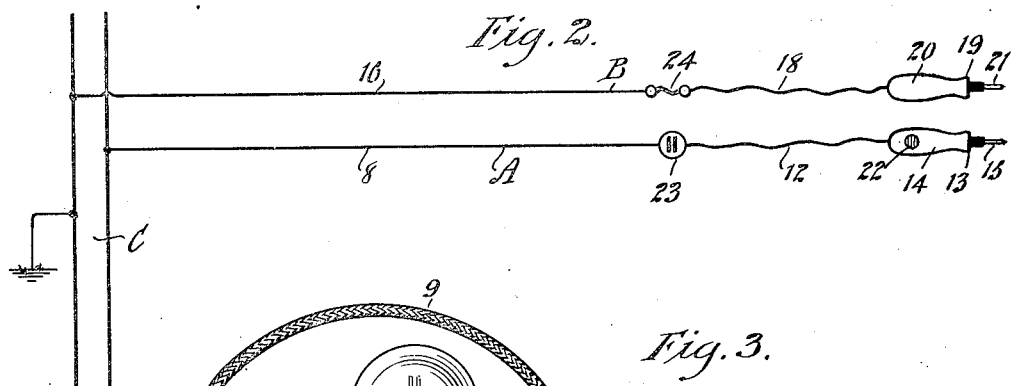
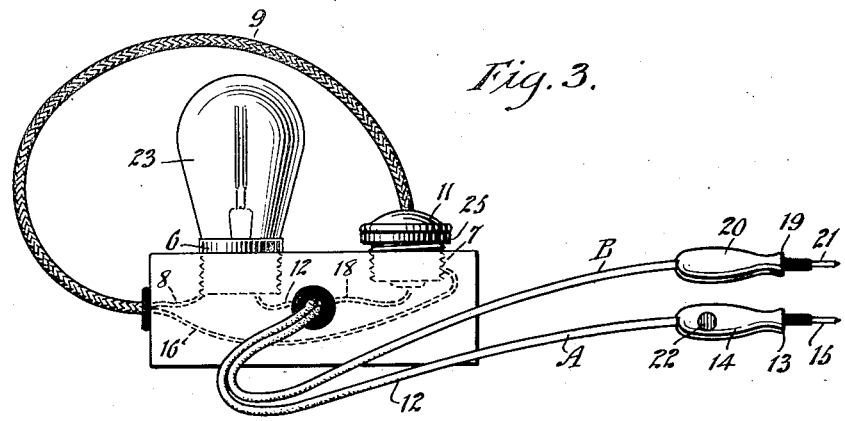
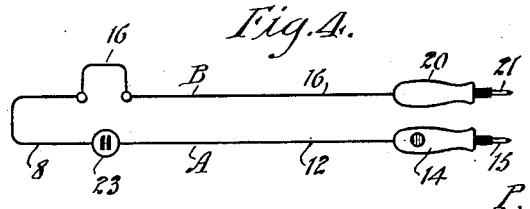
WITNESSES
Edw. Thorpe
INVENTOR
P. G. Krippner
BY Munn & Co
ATTORNEY Patented Dec. 8, 1931

1,835,882

UNITED STATES PATENT OFFICE

PHILIP G. KRIPPNER, OF GREEN BAY, WISCONSIN

ELECTRICAL TESTING DEVICE

Application filed April 21, 1931. Serial No. 531,754.

This invention relates to testing devices for electrical circuits and other equivalent purposes, and comprehends a portable device which is readily convertible for the purpose of testing circuits either when energized or deenergized.

Various testers have been heretofore devised, all of which have been open to the objection that they are limited either to the testing of a deenergized circuit or a live circuit, and it is, therefore, the principal object of the present invention to provide an improved testing device which is optionally convertible to supply current through the device to a deenergized circuit for testing the same or to accomplish the testing of an energized or live circuit.

Further objects of the invention reside in the provision of a testing device of the indicated character which is simple both in its construction, and mode of use, capable of economical production, safe both as to the user and the apparatus being tested and highly efficient in its purpose.

With the above recited and other objects in view, reference is had to the following description and accompanying drawings, in which there is exhibited one example or embodiment of the invention, while the claims define the actual scope of the same.

In the drawings:

Figure 1 is a plan view of the device as it is employed for the purpose of testing deenergized circuits.

Figure 2 is a diagrammatic view illustrating said use of the device.

Figure 3 is a side view of the device as employed for the testing of energized circuits.

Figure 4 is a diagrammatic view of said use of the device.

Referring to the drawings by characters of reference, 5 designates a body which is preferably of an insulating material to support a lamp socket 6 and a plug socket 7 spaced from each other and properly insulated. A conductor wire designated generally by the reference character A includes a lead 8 connected with one side of the socket 6 and extending through an extension cord conduit 9 with its free end attached to the terminal finger 10 of an attachment plug 11. The conductor A further includes a lead 12 extending from the other side of the socket 6 and connected with a terminal testing device 13 including an insulated handle 14 and a projecting contact point or prod 15. A second conductor wire designated generally by the reference character B includes a lead 16 which extends from the base or body 5 through the extension cord conduit 9 and to the terminal finger 17 of the attachment plug 11. The conductor B includes a lead 18 which extends from the other side of the socket 7 and from the base or body 5 to a terminal testing device 19 having an insulated handle 20 and a projecting contact or prod 21. The terminal testing devices 13 and 19 may be suitably distinguished, such as by providing the handle 14 of the device 13 with a distinguishing mark 22, the purpose of which will hereafter appear.

The socket 6 is designed to receive a suitable electrical signaling or indicating device, which in the present instance consists of a neon gas lamp 23. The socket 7 optionally receives a conventional fuse plug 24 or a screw plug 25 of the type which is designed to receive the finger contacts of the attachment plug 11.

In employing the device for the testing of a deenergized circuit, the fuse plug 24 is inserted in the socket 7, as illustrated in Figures 1 and 2, and the attachment plug 11 is plugged into a source of supply, such as a house current line C illustrated conventionally in Figure 2. In plugging in the attachment plug 11, it is essential that the terminal finger 10 in the conductor A engage with the live side of the current line C. This may be tested by touching the contact or prod 15 with the hand or to a grounded object to ascertain whether or not the lamp 23 glows. If it glows, it is an indication that the attachment plug has been inserted in the right position; otherwise, the plug must be removed and inserted in the reverse manner. After the proper plugging in has been obtained, the testing of the circuit may be accomplished by engaging the contact points or prods 15 and 21 with the circuit being tested. During the testing, it is apparent that it is impossible to burn out the object being tested should it become grounded due to the fact that the lamp 23 limits the amount of current flowing to the object under test, if the lamp is arranged in the live side of the circuit, while the fuse 24 functions to prevent damage to the object being tested if said fuse is arranged in the live side of the circuit. If the lamp glows, it is an indication that the circuit being tested is continuous, but, obviously, if the lamp fails to glow, it indicates that the circuit is not continuous and by testing out various points, the trouble or faulty parts can be readily traced and the proper correction made.

When the device is to be used for testing an energized circuit, the fuse plug 24 is removed and the screw plug 25 is inserted in the socket 7 and the contact fingers 10 and 17 of the attachment plug 11 are inserted in the screw plug. This arrangement is clearly illustrated in Figures 3 and 4 of the drawings, in which instance the conductors A and B are connected or bridged by the socket 7 so that there is a continuity between the contact points or prods 15 and 21. By this arrangement, it is possible to test circuits or parts of circuits of 100 volts or more that are presumed to be energized, by engaging the prods or contact points with various components of the circuits being tested. If a glow occurs in the lamp 23, it denotes a difference of potential between the points tested, and if the lamp fails to glow, it is an indication of lack of potential difference between the points. The device may also be employed for testing resistance by the relative intensity of the glow of the lamp.

While there has been illustrated and described a single and preferred embodiment of the invention, no limitation is necessarily made to the precise structural details, which may be varied within the scope of the appended claims.

What is claimed is:

1. A portable device for testing energized or deenergized electrical circuits comprising an attachment plug, a pair of conductors leading therefrom and having testing prods respectively at the opposite free terminals thereof, an electrically responsive signal interposed in one of said conductors and a socket interposed in the other conductor, said socket adapted to optionally receive said attachment plug or a fuse plug.

2. A portable device for testing energized or deenergized electrical circuits comprising an attachment plug, a pair of conductors leading therefrom and having testing prods respectively at the opposite free terminals thereof, an electrically responsive signal interposed in one of said conductors and a socket interposed in the other conductor, said socket adapted to optionally receive said attachment plug for testing energized circuits or a fuse plug for testing deenergized circuits when the attachment plug is connected with a source of electrical energy.

3. A portable device for testing energized and deenergized electrical circuits comprising an attachment plug, a pair of conductors leading therefrom and having independent testing prods respectively at the free terminals thereof, a neon lamp interposed in one of said conductors and a socket interposed in the other conductor, said socket adapted to optionally receive said attachment plug or fuse plug.

4. A portable device for testing energized or deenergized electrical circuits comprising an attachment plug, a pair of conductors leading therefrom each having a socket interposed therein and a testing prod at the free terminal of each conductor, a neon lamp arranged in one socket, the remaining socket adapted to optionally receive said attachment plug or fuse plug.

5. A portable device for testing energized or deenergized electrical circuits comprising an attachment plug, a pair of conductors leading therefrom each having a socket interposed therein, a body supporting said sockets in spaced relation and insulated from each other and a testing prod at the free terminal of each conductor, a neon lamp arranged in one socket, the remaining socket adapted to optionally receive said attachment plug or fuse plug.

6. A testing device comprising two electric conductors, separate terminal means for each conductor, a second terminal means for each of said conductors, a fuse receiving socket interposed in one of said conductors and an indicator interposed in the other conductor, said second terminal means being receivable in said socket.

7. A portable device convertible to energize and deenergize circuits or to test live circuits, said device including a lamp socket, a neon lamp therein, conductors leading from the opposite sides of said socket, a plug socket, conductors leading from the opposite sides thereof, an attachment plug connected to the terminals of the conductors leading from one side of each socket and independent testing prods carried by the free terminals of the conductors leading from the opposite side of each socket, said plug socket adapted to optionally receive a fuse plug for said attachment plug.

8. A portable electrical testing device including in combination a pair of sockets, an electrically responsive indicator in one socket, a conductor leading from one side of each socket, an attachment plug having a pair of contact fingers in which the free terminals of said conductors are connected, a conductor leading from the opposite side of each socket and independent contact prods having insulated handles carried by each of the latter conductors, the remaining socket adapted to optionally receive a fuse plug for use in testing a deenergized circuit with the attachment plug in a socket arranged in a source of electrical energy or to receive a screw plug associated with said attachment plug for testing a live circuit.

PHILIP G. KRIPPNER.